US012585860B2

(12) United States Patent
Ikeda

(10) Patent No.: US 12,585,860 B2
(45) Date of Patent: Mar. 24, 2026

(54) INFORMATION PROCESSING APPARATUS, METHOD, AND A NON-TRANSITORY COMPUTER-READABLE STORAGE MEDIUM

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/508,067

(22) Filed: Nov. 13, 2023

(65) Prior Publication Data

US 2024/0160831 A1 May 16, 2024

(30) Foreign Application Priority Data

Nov. 15, 2022 (JP) ................................. 2022-182794

(51) Int. Cl.
| | |
|---|---|
| *G06F 17/00* | (2019.01) |
| *G06F 40/106* | (2020.01) |
| *G06F 40/109* | (2020.01) |

(52) U.S. Cl.
CPC .......... *G06F 40/109* (2020.01); *G06F 40/106* (2020.01)

(58) Field of Classification Search
CPC ............................. G06F 40/109; G06F 40/106
See application file for complete search history.

(56) References Cited

U.S. PATENT DOCUMENTS

| | | | | |
|---|---|---|---|---|
| 10,949,603 | B2 * | 3/2021 | Takahashi ............. | G06F 40/109 |
| 12,306,897 | B2 * | 5/2025 | Ikeda ................... | G06F 16/9574 |
| 2004/0205572 | A1 * | 10/2004 | Fields ................... | G06F 16/958 |
| | | | | 715/255 |
| 2008/0304113 | A1 * | 12/2008 | Curry .................. | G06F 16/5846 |
| | | | | 358/426.12 |
| 2010/0017708 | A1 * | 1/2010 | Tomida ................... | G09G 5/26 |
| | | | | 715/269 |
| 2012/0110438 | A1 * | 5/2012 | Peraza ................. | G06F 40/109 |
| | | | | 345/660 |

(Continued)

FOREIGN PATENT DOCUMENTS

| | | | | | |
|---|---|---|---|---|---|
| CN | 101393413 | A | * | 3/2009 | ............. H04N 1/393 |
| CN | 110532488 | A | * | 12/2019 | |

(Continued)

*Primary Examiner* — Laurie A Ries
(74) *Attorney, Agent, or Firm* — Canon U.S.A., Inc. IP Division

(57) ABSTRACT

An information processing apparatus comprises: a memory storing a program; and a processor in communication with the memory, the processor when executing the program causes the information processing apparatus to: acquire screen information for identifying a size of a screen of a communication terminal; determine, based on the screen information, a minimum font size for displaying characters included in a predetermined Web page on the screen of the communication terminal in a predetermined font size; set a font size of a character included in the predetermined Web page and smaller than the minimum font size to be larger than or equal to the minimum font size; generate display information for displaying the predetermined Web page on a screen of the communication terminal based on the set font size; and transmit the generated display information to the communication terminal.

9 Claims, 12 Drawing Sheets

(56)                    References Cited

U.S. PATENT DOCUMENTS

| | | | | |
|---|---|---|---|---|
| 2012/0147033 A1* | 6/2012 | Singhal | .................. | G06F 3/147 |
| | | | | 345/662 |
| 2013/0321617 A1* | 12/2013 | Lehmann | ............. | G06F 3/0484 |
| | | | | 345/472 |
| 2014/0208202 A1* | 7/2014 | Ellis | ........................ | H04L 67/02 |
| | | | | 715/238 |
| 2015/0199329 A1* | 7/2015 | Kim | .................... | G06V 30/416 |
| | | | | 715/254 |
| 2016/0124910 A1* | 5/2016 | Nordback | ............. | G06F 40/106 |
| | | | | 715/229 |
| 2017/0339232 A1* | 11/2017 | Ando | ................ | H04N 1/00204 |
| 2021/0004431 A1* | 1/2021 | Li | ....................... | G06V 30/245 |
| 2022/0004698 A1* | 1/2022 | Ikeda | ................... | G06F 40/109 |

FOREIGN PATENT DOCUMENTS

| | | | | |
|---|---|---|---|---|
| JP | 6645311 B | 2/2020 | | |
| WO | WO-2014176482 A1 * | 10/2014 | ........... | G06F 40/103 |

* cited by examiner

F I G. 1
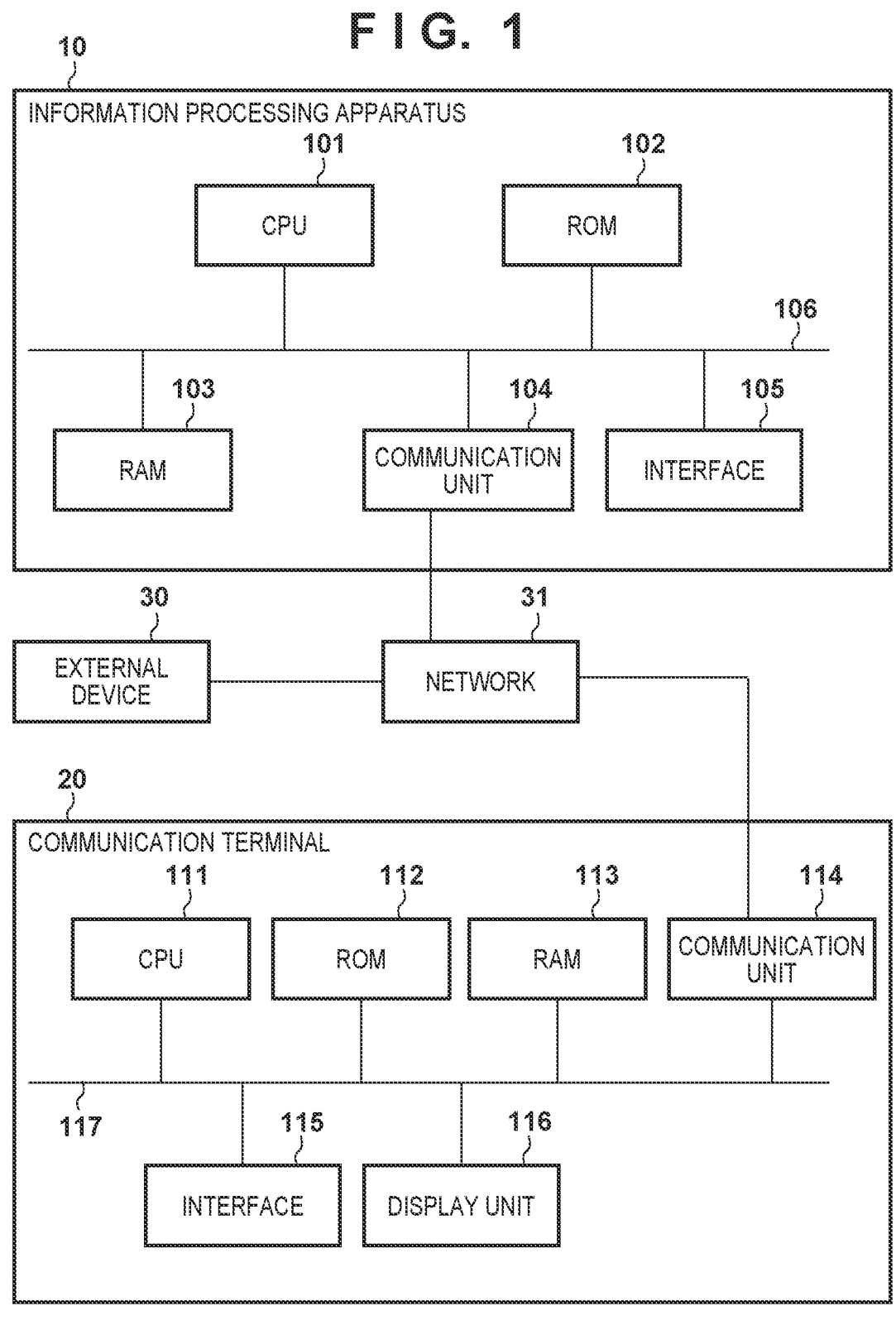

10

INFORMATION PROCESSING APPARATUS

| 201 | 202 | 203 | 204 |
|---|---|---|---|
| VIRTUAL BROWSER | INSTRUCTION DETERMINATION UNIT | SCREEN INFORMATION ACQUISITION UNIT | FONT SIZE DETERMINATION UNIT |

| 205 | 206 | 207 |
|---|---|---|
| FONT SIZE SETTING UNIT | DISPLAY INFORMATION GENERATION UNIT | COMMUNICATION CONTROL UNIT |

20

COMMUNICATION TERMINAL

| 211 | 212 | 213 |
|---|---|---|
| DEDICATED VIEW | COMMUNICATION CONTROL UNIT | SCREEN INFORMATION PROVIDING UNIT |

F I G. 3
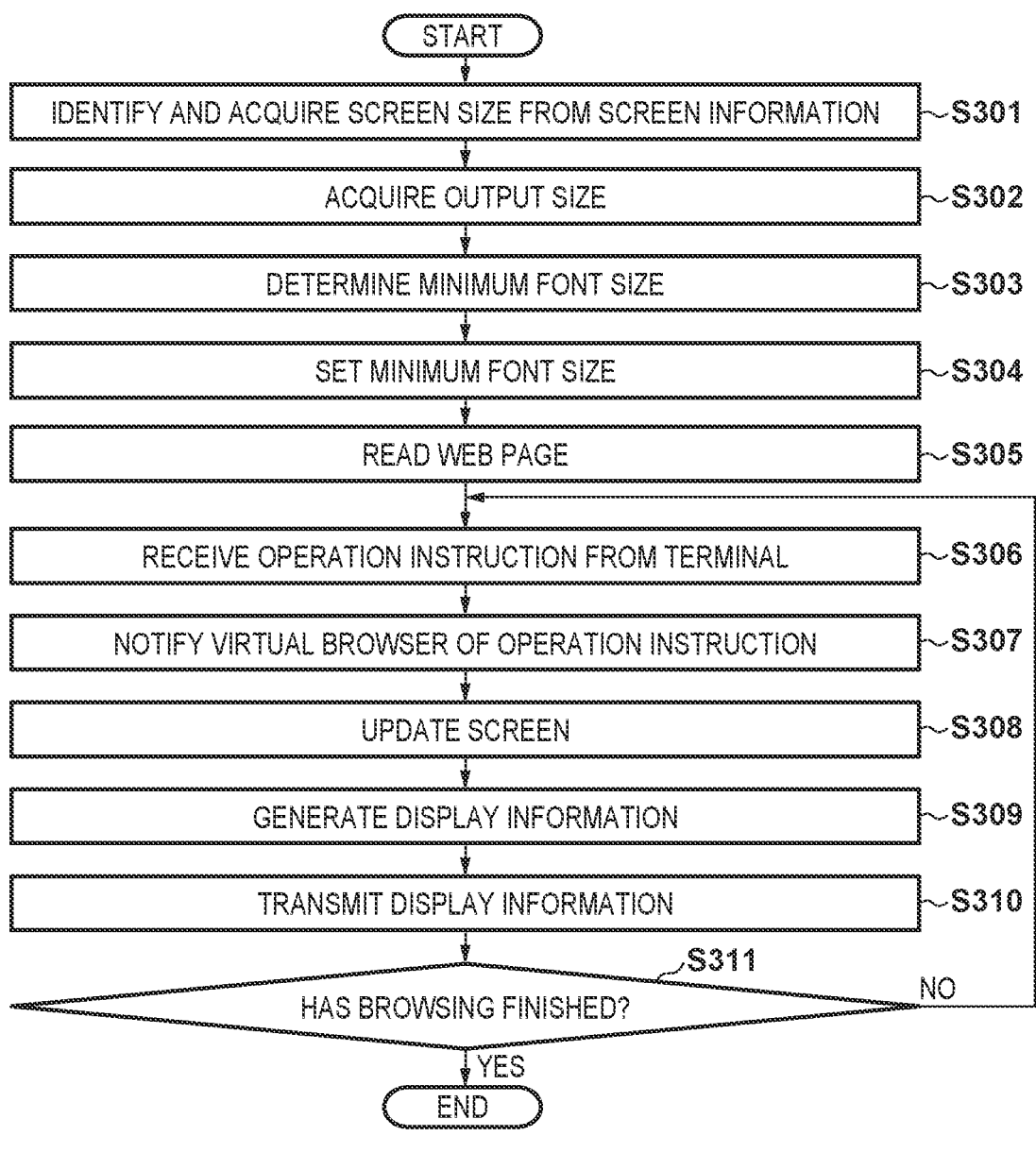

F I G. 4
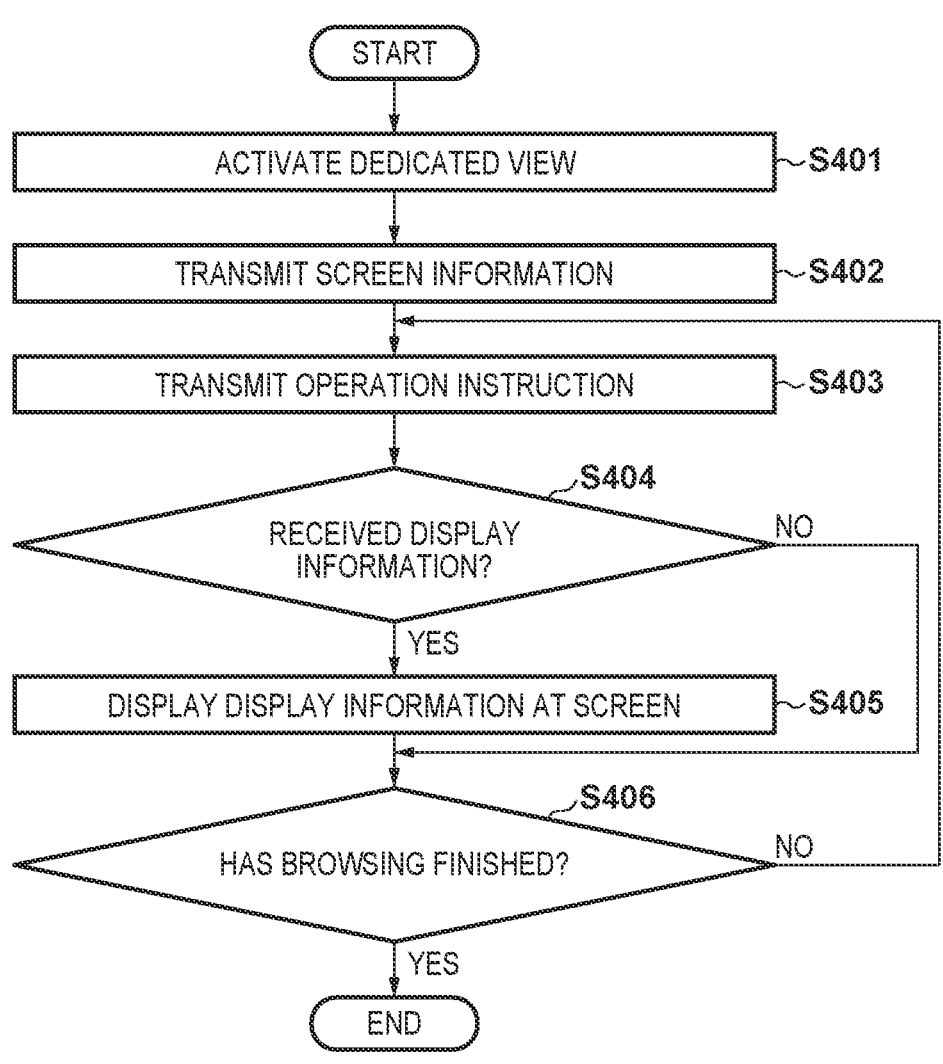

F I G. 5A

```
// TRANSMIT SCREEN SIZE TO CLOUD AS POST DATA OF HTTPS COMMUNICATION
//(REFERENCE deviceInfo in LATERAL CLOUD)
var devideInfo = {};
deviceInfo.width = 400;
deviceInfo.height = 300;
webclient.post({
  url: "https://www.cloudbrowser.canon",
  headers: {
    "content-type": "application/json"
  },
  body: JSON.stringify(deviceInfo)
}, function (error, response, body){
  //THIS BLOCK WILL BE EXECUTED UPON RESPONSE FROM CLOUD.
});
```

F I G. 5B

```
// visibleFontSize IS SMALLEST VISIBLE FONT SIZE
// webPageSize IS SIZE OF DRAWING RESULT
// CALCULATE webPageSize AND deviceScreenSize FROM width AND height RESPECTIVELY
int minFontSize = visibleFontSize * (webPageSize / deviceScreenSize);

// USE BROWSER ENGINE API
webkit_settings_set_minimum_font_size(webkitSettings, minFontSize);
```

601

602

701

702

F I G.  8A
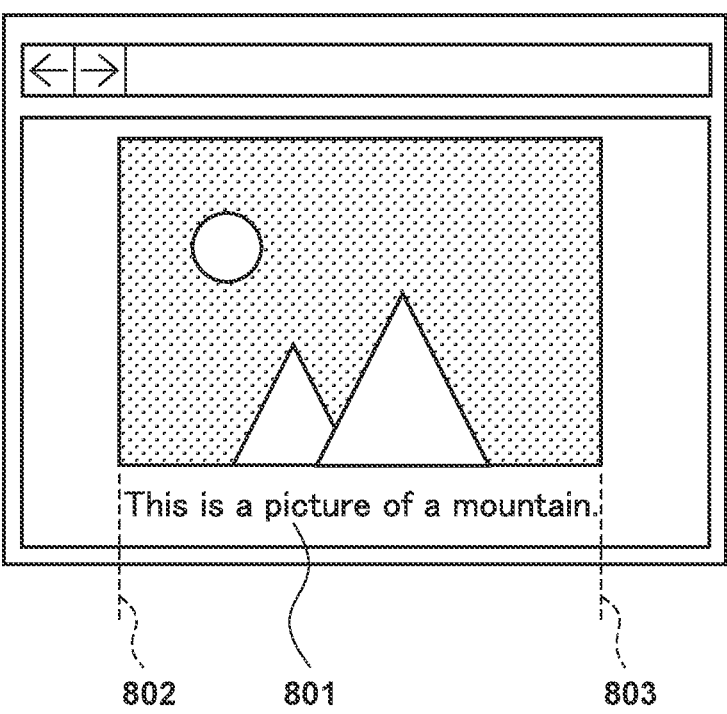
802     801     803
F I G.  8B
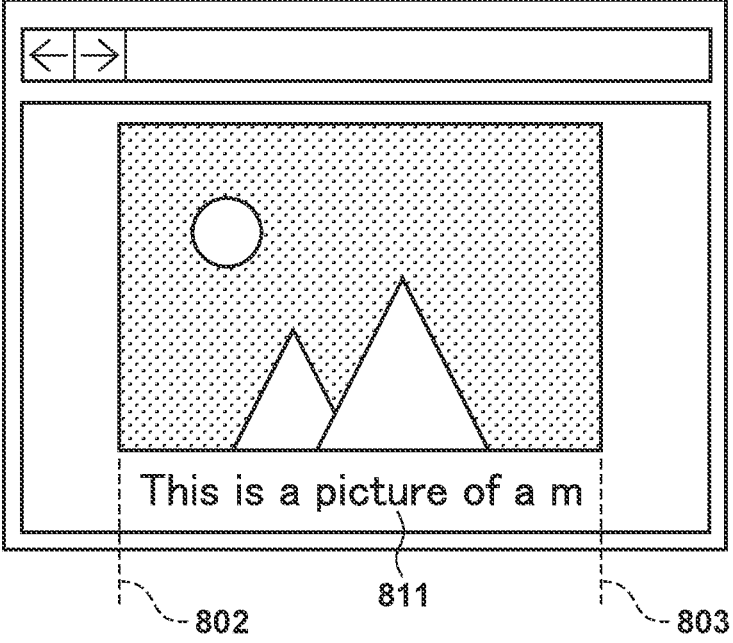
802     811     803

FIG. 9

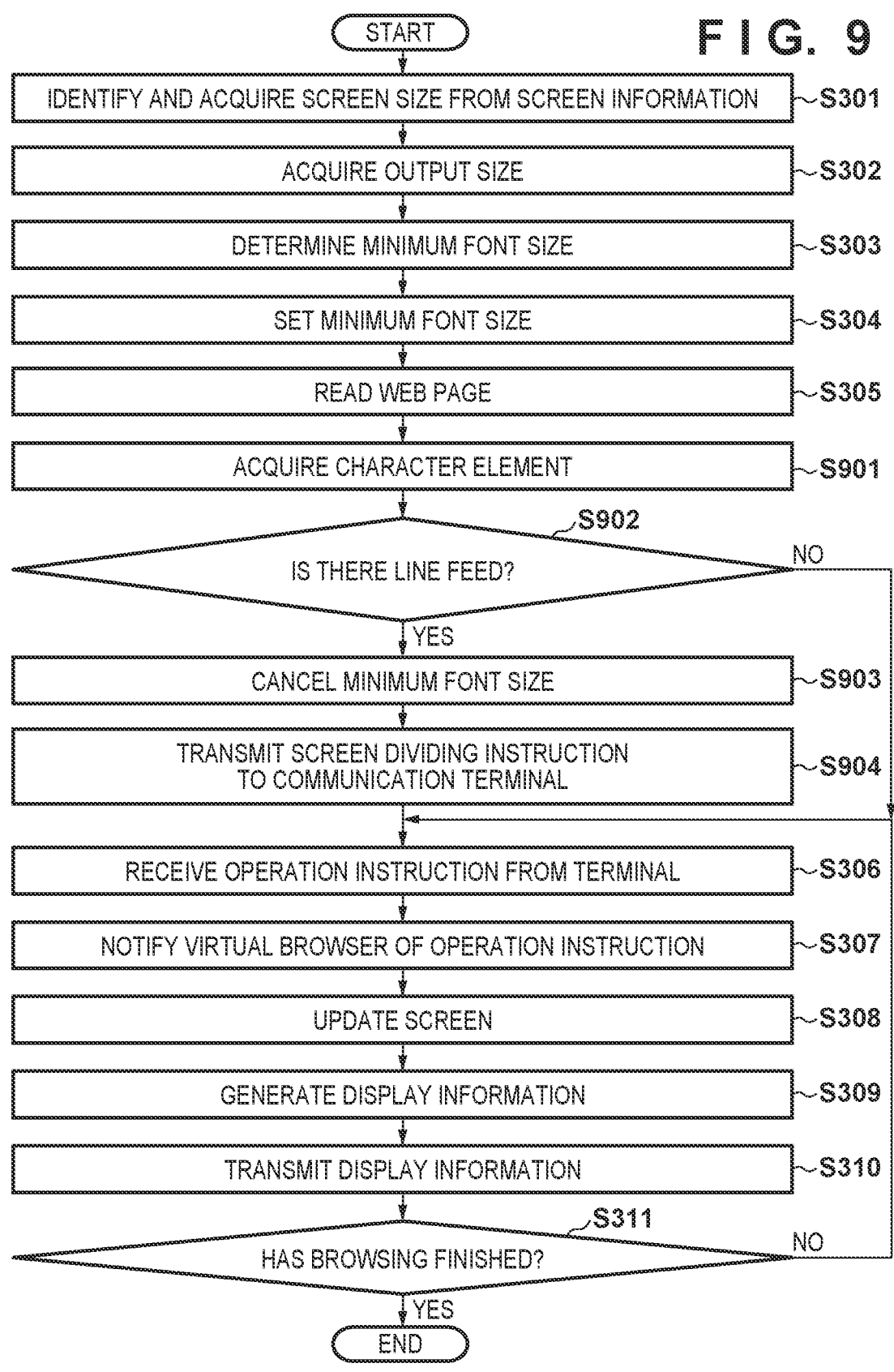

START

IDENTIFY AND ACQUIRE SCREEN SIZE FROM SCREEN INFORMATION — S301

ACQUIRE OUTPUT SIZE — S302

DETERMINE MINIMUM FONT SIZE — S303

SET MINIMUM FONT SIZE — S304

READ WEB PAGE — S305

ACQUIRE CHARACTER ELEMENT — S901

S902 — IS THERE LINE FEED? — NO

YES

CANCEL MINIMUM FONT SIZE — S903

TRANSMIT SCREEN DIVIDING INSTRUCTION TO COMMUNICATION TERMINAL — S904

RECEIVE OPERATION INSTRUCTION FROM TERMINAL — S306

NOTIFY VIRTUAL BROWSER OF OPERATION INSTRUCTION — S307

UPDATE SCREEN — S308

GENERATE DISPLAY INFORMATION — S309

TRANSMIT DISPLAY INFORMATION — S310

S311 — HAS BROWSING FINISHED? — NO

YES

END

F I G. 10
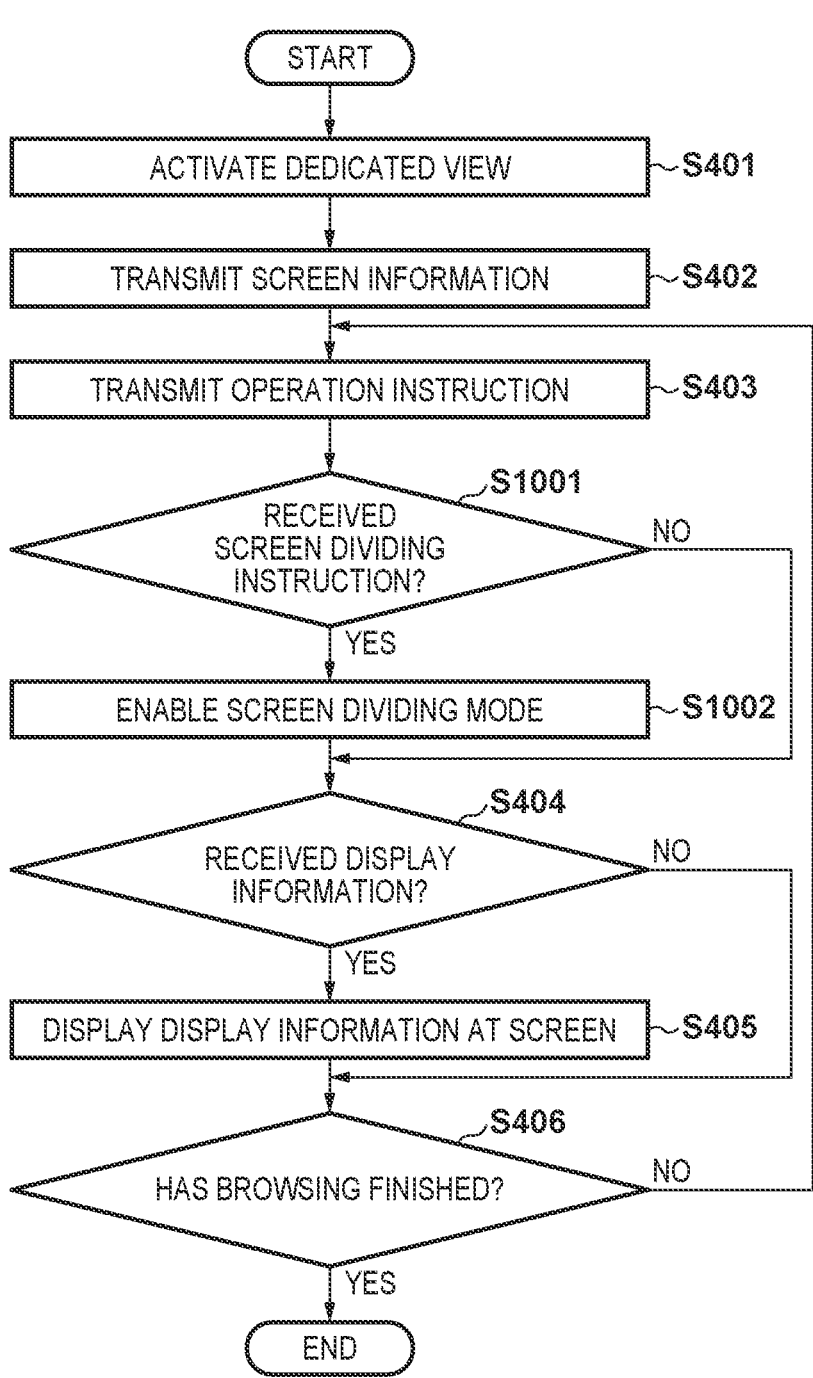

F I G. 11A
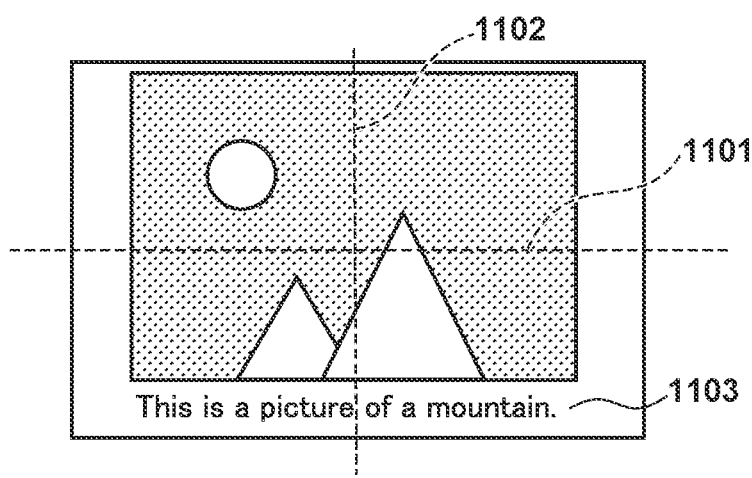
F I G. 11B
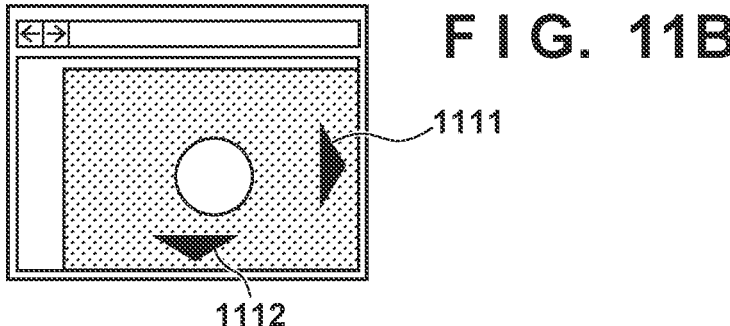
F I G. 11C
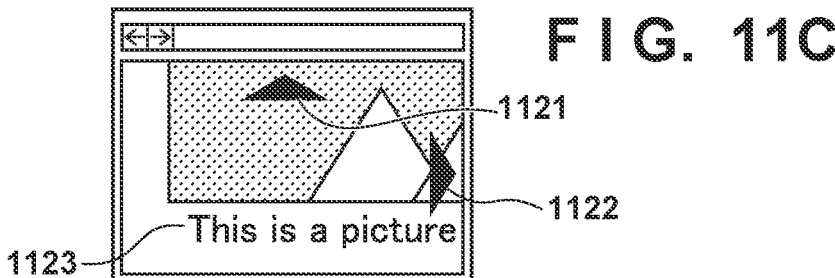

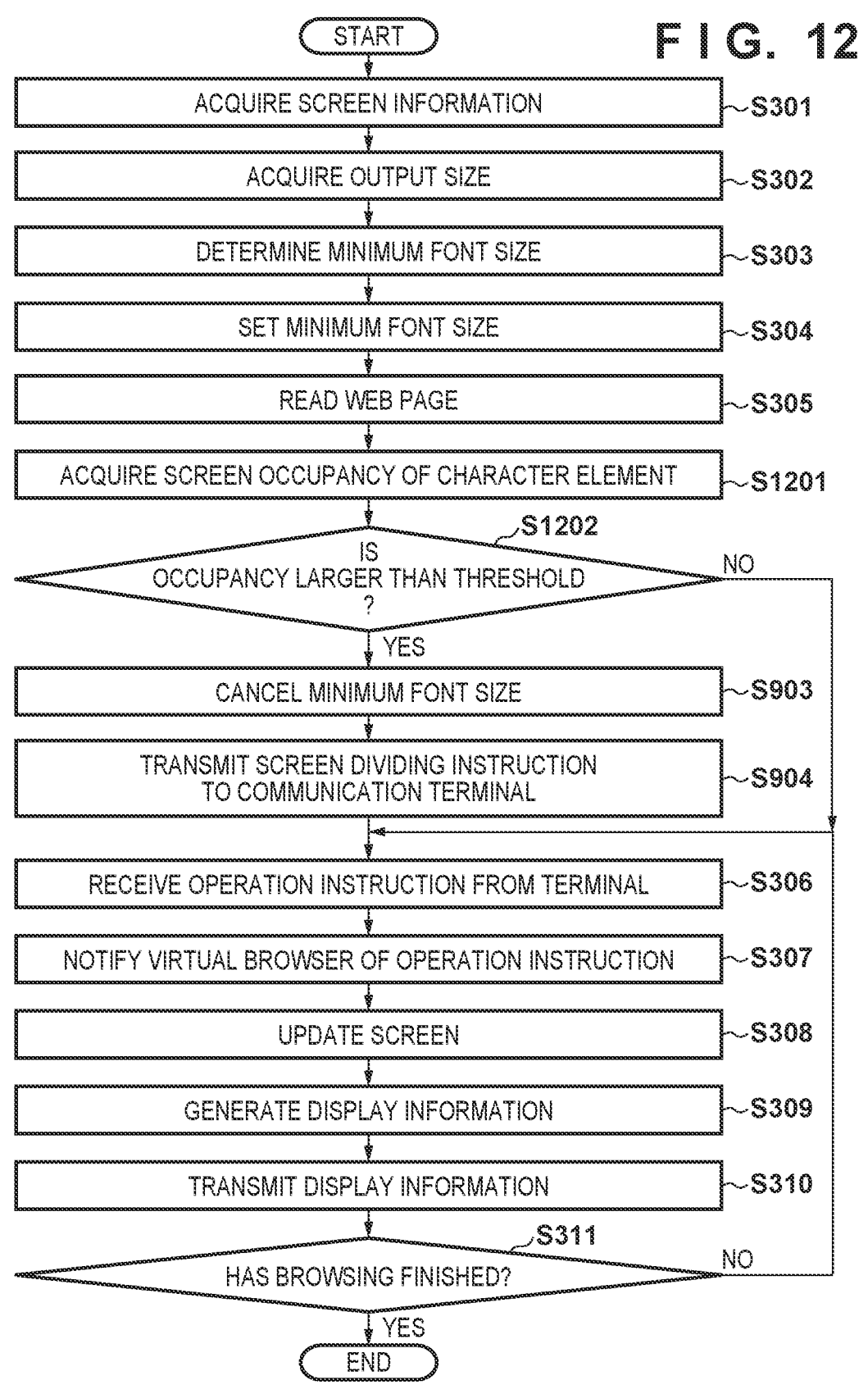
F I G. 12

INFORMATION PROCESSING APPARATUS, METHOD, AND A NON-TRANSITORY COMPUTER-READABLE STORAGE MEDIUM

BACKGROUND

Field

The present disclosure relates to an information processing apparatus, a method, and a non-transitory computer-readable storage medium.

Description of the Related Art

At present, a communication device equipped with a Web browser (hereinafter, "the browser") having a function of browsing a Web page has become widespread. The communication device can cooperate with an external service by displaying a Web page of the external service through the browser. Such a communication devices can adopt various screen sizes, such as, for example, in the cases of an embedded device having a relatively small screen size for the purpose of saving space or a notebook computer with a relatively large screen. In such cases, an unnecessary margin can be generated at the end of the Web page depending on the combination of the layout of the Web page and the screen size.

In Japanese Patent No. 6645311, when it is determined that a Web page to be displayed is a specific type of Web page, the Web page to be displayed is enlarged and displayed based on the size of the display screen of the browser regardless of whether the size of the Web page to be displayed is designated. As a result, a blank area can be prevented from being generated when a Web page is displayed on a product having a large screen.

A cloud browser is a type of browser that generates display information of a Web page on a cloud server. The calculation load is not applied to a communication terminal by executing processing with a high calculation load such as analyzing process and executing process of the Web page on the server. In the cloud browser, when the size of rendering output of a Web page generated on the cloud server is different from the screen size of the communication terminal, the communication terminal performs scaling of the display based on the screen size.

In a case where an image generation system exists between a communication terminal and an external Web service like a cloud browser, the Web page is scaled based on the size of a rendering result of the image generation system in the method of Japanese Patent No. 6645311. When a rendering result generated by an image generation system is reduced and displayed in a cloud browser of a communication device having a small screen size, characters included in the Web page are displayed in a small size, and there is a problem in that visibility of the characters lowers for a user.

For example, currently, a browser is used in embedded products such as copiers. In such products, when a Web page created for a small screen is displayed, blank areas are formed at the right end and the lower end of the screen. In this case, an increase in the screen size cannot be sufficiently utilized, and the appearance is poor. In addition, among embedded products, there is a product in which the screen size increases due to product version upgrade.

That is, when a Web page including characters is displayed on a communication terminal in a cloud browser, there is a problem in that the visibility of the characters lowers depending on the screen size.

SUMMARY

The present disclosure has been made in view of the above problems, and provides a technique for displaying a Web page based on a screen size of a communication terminal in a cloud browser.

According to aspects of the present disclosure, an information processing apparatus comprises: a memory storing a program; and a processor in communication with the memory, the processor when executing the program causes the information processing apparatus to: acquire screen information for identifying a size of a screen of a communication terminal; determine, based on the screen information, a minimum font size for displaying characters included in a predetermined Web page on the screen of the communication terminal in a predetermined font size; set a font size of a character included in the predetermined Web page and smaller than the minimum font size to be larger than or equal to the minimum font size; generate display information for displaying the predetermined Web page on a screen of the communication terminal based on the set font size; and transmit the generated display information to the communication terminal.

Further features of the present disclosure will become apparent from the following description of exemplary embodiments with reference to the attached drawings.

BRIEF DESCRIPTION OF THE DRAWINGS

FIG. 1 is a configuration diagram of an information processing system according to a first embodiment.

FIG. 3 is a flowchart illustrating processing of the information processing apparatus according to the first embodiment.

FIG. 4 is a flowchart illustrating processing of the communication terminal according to the first embodiment.

FIG. 5A is a diagram illustrating an example of a message for notifying the information processing apparatus of screen information of the communication terminal.

FIG. 5B is a diagram illustrating a method for setting a minimum font size.

FIG. 8A is a diagram illustrating a rendering result in a case where a minimum font size is not set.

FIG. 8B is a diagram illustrating an example of a case where an additional line feed occurs when the minimum font size is set.

FIG. 9 is a flowchart illustrating processing executed by an information processing apparatus according to a first processing example of a second embodiment.

FIG. 10 is a flowchart illustrating processing executed by a communication terminal according to the first processing example of the second embodiment.

FIG. 11A is a display example in a screen dividing mode.

FIG. 11B is a display example in a screen dividing mode.

FIG. 11C is a display example in a screen dividing mode.

FIG. 12 is a flowchart illustrating processing executed by an information processing apparatus according to a second processing example of the second embodiment.

DESCRIPTION OF THE EMBODIMENTS

Figure 2A:
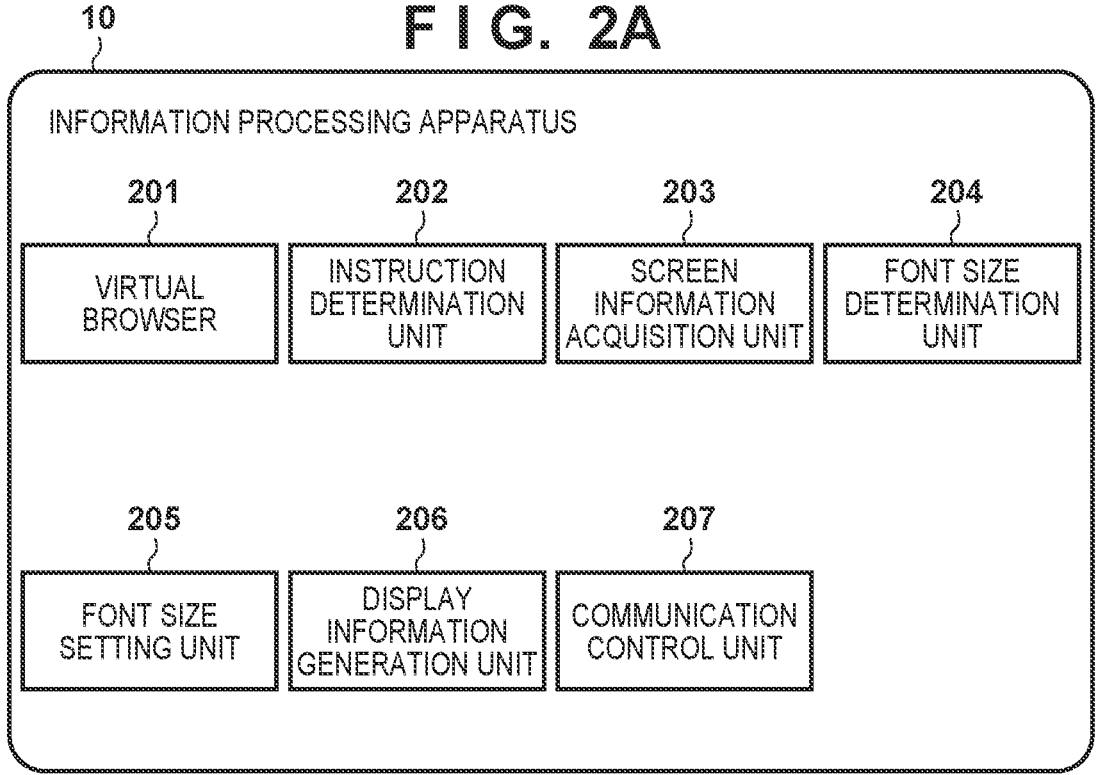
FIG. 2A is a software configuration diagram of an information processing apparatus.

Hereinafter, embodiments will be described in detail with reference to the attached drawings. The following embodiments are not intended to limit the scope of the claims. Multiple features are described in the embodiments, but all such features are not necessarily required, and multiple features can be combined as appropriate. In the attached drawings, the same reference numerals are provided to the same or similar configurations, and redundant description thereof is omitted.

In the following embodiments, a technique for preventing the visibility of the characters from lowering in a cloud browser will be described.

First Embodiment

In the present embodiment, an example will be described in which when the screen size of a communication terminal is smaller than the size (output size) of the rendering output of an image generation system, the minimum font size is applied to display the Web page in the cloud browser.

FIG. 1 illustrates a configuration of an information processing system according to the present embodiment. The information processing system 1 includes an information processing apparatus 10. The information processing system 1 includes a rendering engine for realizing a function as a cloud browser that transmits display information to a communication terminal 20 and enables display of a predetermined Web page. In order to prevent lowering in visibility of the characters, characters displayed in a size in which the visibility lowers when the display information is displayed are detected, and rendering is performed so that the characters are displayed in a size in which the visibility is not lowered.

The communication terminal 20 acquires display information for displaying a Web page from the information processing apparatus 10 and displays the display information on a screen by operating as a client of the cloud browser. Since processing such as rendering for displaying a Web page is executed by the information processing apparatus 10, the processing load of the communication terminal 20 can be suppressed, and for example, the Web page can be browsed even in the communication terminal 20 having low processing capacity.

In a case where the Web page includes an instruction to acquire information such as an image and a moving image from another external device, the information processing apparatus 10 acquires the information, renders the acquired information, and transmits the information to the communication terminal 20. Therefore, since the information processing apparatus 10 can determine whether there is a security risk in the Web page, the security risk of the communication terminal 20 can be suppressed.

The information processing apparatus 10 transmits display information for displaying a predetermined Web page based on the information acquired from the external device 30 to the communication terminal 20 via the network 31. The display information is information generated based on a rendering result obtained by rendering the Web page. In one example, the Web page is information described in HTML (Hyper Text Markup Language), CSS (Cascading Style Sheets), or JavaScript®. In addition, the Web page can include, for example, an instruction to acquire information of a link destination including URL information, such as a frame or a hyperlink. The display information does not include an instruction to acquire information of a link destination including URL information.

The information processing apparatus 10 includes a central processing unit (CPU) 101, a read only memory (ROM) 102, a random access memory (RAM) 103, a communication unit 104, and an interface (IF) 105.

The CPU 101 is a control unit that controls the overall operation of the information processing apparatus 10, and includes one or more processors. The ROM 102 is a memory that stores programs executed by the CPU 101 and parameters used in the programs. The RAM 103 is a memory that temporarily stores programs and data supplied from an external device or the like.

The communication unit 104 is a communication unit including a communication circuit for communicating with an external device via wired or wireless communication. The communication unit 104 acquires a Web page from the external device 30 via the network 31. In the present embodiment, the external device 30 is described as a device arranged outside the information processing system 1, but the external device 30 can be arranged inside the information processing system 1. When a frame or a hyperlink is included in a Web page, the communication unit 104 can acquire information from a communication device different from the external device 30. That is, when acquiring a Web page, the information processing apparatus 10 can collect information for rendering the Web page based on information acquired from a plurality of external devices 30.

The IF 105 is an interface to which an input device such as a keyboard and a mouse and an output device such as a microphone and a display are connected.

The bus 106 is a system bus that connects the units 101 to 105 in a communicable manner. There can be an interface with a pointing device such as a mouse or an input device such as a keyboard for inputting data in response to an operation from a user. There can be a hard disk, a memory card, or the like fixedly installed in the information processing apparatus 10. Alternatively, there can be an optical disk such as a flexible disk (FD) or a compact disk (CD) detachable from the information processing apparatus 10, an external storage device including a magnetic or optical card, an IC card, a memory card, and the like. There can be a network interface or the like for connecting to a network line such as the Internet.

Note that, in FIG. 1, the information processing apparatus 10 is illustrated as including one CPU 101, ROM 102, and RAM 103, but there can be more than one instance of each.

The communication terminal 20 includes a CPU 111, a ROM 112, a RAM 113, a communication unit 114, an interface 115, and a display unit 116. Since the CPU 111, the ROM 112, the RAM 113, the communication unit 114, and the interface 115 have the same configurations as the CPU 101, the ROM 102, the RAM 103, the communication unit 104, and the interface 105 of the information processing apparatus 10, the description thereof will be omitted.

The display unit 116 is a display device including a light-emitting diode (LED) panel or a liquid crystal panel. Hereinafter, the display unit 116 can be referred to as a screen.

The information processing apparatus 10 can be a virtual computer whose functions are implemented by software on an operating system (OS). In such a case, the function of the information processing apparatus 10 can be realized by cooperation of a plurality of computers. The function of the information processing apparatus 10 can be realized by cloud computing. In one example, communication between the information processing apparatus 10 and the communication terminal 20 and communication between the information processing apparatus 10 and the external device 30 are performed via a gateway (not illustrated).

Next, functional blocks of the information processing apparatus 10 and the communication terminal 20 will be described with reference to FIGS. 2A and 2B. As described above, when the functions of the information processing apparatus 10 are realized by a plurality of computers cooperating with each other, at least one functional block of the information processing apparatus 10 can be realized by the plurality of computers.

As illustrated in FIG. 2A, the information processing apparatus 10 includes a virtual browser 201, an instruction determination unit 202, a screen information acquisition unit 203, a font size determination unit 204, a font size setting unit 205, a display information generation unit 206, and a communication control unit 207.

The virtual browser 201 is a so-called browser engine, and generates (renders) an image to be displayed on the communication terminal 20 by executing analysis of HTML, JavaScript®, CSS, and the like and processes associated with a user operation and a communication event. The image output from the virtual browser 201 is also referred to as a rendering result.

The instruction determination unit 202 acquires operation information related to a user operation received by the communication terminal 20 from the user via the communication unit 104 and determines a user instruction. The operation information includes information indicating whether the user has selected a selection element included in the Web page being displayed in the dedicated view 211. The operation information can include position information of a place where the user has performed a selection operation on the dedicated view 211. The instruction determination unit 202 determines a user instruction such as selection of a specific element on a Web page, transition of a different Web page, or an end instruction of browsing based on the operation information.

The screen information acquisition unit 203 acquires screen information that is possible to identify the screen size of the communication terminal 20 via the communication unit 104. The font size determination unit 204 identifies the screen size of the communication terminal 20 based on the screen information of the communication terminal 20 acquired by the screen information acquisition unit 203, and determines the minimum font size for appropriately displaying the acquired font size of the Web page on the screen.

The font size setting unit 205 sets the font size generated by the virtual browser 201 and causes the virtual browser 201 to output the rendering result. The display information generation unit 206 generates display information to be transmitted to the communication terminal 20 for display on the communication terminal 20 based on the processing result of the virtual browser 201. In one example, the display information is a rendering output of the virtual browser 201. In another example, the display information is a moving image generated based on the rendering output of the virtual browser 201.

The communication control unit 207 controls the communication unit 104 to communicate with the external device 30 and the communication terminal 20. In one example, the communication control unit 207 communicates with the external device 30 and the communication terminal 20 via a gateway.

Figure 2B:
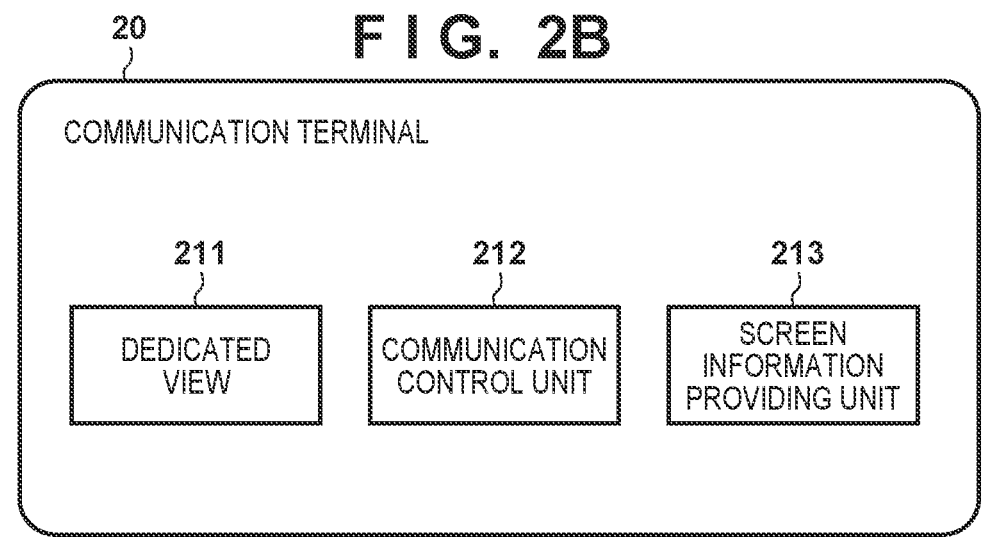
FIG. 2B is a software configuration diagram of a communication terminal.

As illustrated in FIG. 2B, the communication terminal 20 includes a dedicated view 211, a communication control unit 212, and a screen information providing unit 213.

The dedicated view 211 performs display on the display unit 116 based on the display information received from the information processing apparatus 10. In one example, the dedicated view 211 scales and displays the rendering output such that the entire rendering output of virtual browser 201 fits in the display unit 116. In a case where a selection element included in the display information is selected by the user, the dedicated view 211 transmits information indicating the selected selection element to the information processing apparatus 10. That is, the dedicated view 211 has a function serving as a display control unit and a function serving as an operation information transmission unit that transmits operation information indicating a user operation received by the communication terminal 20 from the user.

The communication terminal 20 transmits a uniform resource locator (URL) of a Web page that the user desires to browse to the information processing apparatus 10 through the communication control unit 212.

The communication control unit 212 controls the communication unit 114 to communicate with the information processing apparatus 10.

The screen information providing unit 213 transmits screen information related to the display unit 116 of the communication terminal 20 to the information processing apparatus 10. In one example, the screen information can include information indicating the screen resolution of the display unit 116, or can include information regarding the physical dimensions of the display unit 116 such as the number of inches.

In this manner, the communication terminal 20 accesses the information processing apparatus 10 using the dedicated view 211, and a service performed by the information processing apparatus 10 for accessing a Web page is referred to as a cloud browser.

FIGS. 3 and 4 are flowcharts illustrating an example of a process according to the present embodiment. FIG. 3 is a processing flow of the information processing apparatus 10, and is realized by the CPU 101 of the information processing apparatus 10 developing a program stored in the ROM 102 in the RAM 103 and executing the program. FIG. 4 is a processing flow of the communication terminal 20, and is realized by the CPU 111 of the communication terminal 20 developing a program stored in the ROM 112 in the RAM 113 and executing the program.

First, processing of the information processing apparatus 10 will be described with reference to FIG. 3.

In the present example, first, the screen information acquisition unit 203 acquires the screen of the communication terminal notified from the communication terminal 20 and determines the screen size (S301). An example of the screen information transmitted from the communication terminal 20 to the information processing apparatus 10 will be described with reference to FIG. 5A.

In FIG. 5A, deviceInfo is a structure that stores the width and the height of the screen size. The width of the screen size is stored in deviceInfo.width. The height of the screen size is stored in deviceInfo.height. In "body: JSON.stringify (deviceInfo)", deviceInfo can be stored in BODY of the request of the HTTP communication. When the dedicated view 211 of the communication terminal 20 designates and transmits a uniform resource locator (URL) of the information processing apparatus 10, screen information can be provided to the information processing apparatus 10 by using a POST method of the HTTP communication. The screen information acquisition unit 203 can determine the screen size by analyzing deviceInfo.

Next, the size of the rendering output (output size) generated by the virtual browser 201 is acquired (S302). In one example, the rendering result is a screen size preset by the virtual browser 201, and setting information indicating a width and a height is provided by the virtual browser 201. Subsequently, the font size determination unit 204 calculates the minimum font size from the ratio between the screen size of the communication terminal 20 acquired in S301 and the output size acquired in S302 (S303).

A method of calculating the minimum font size will be described with reference to FIG. 5B. The visibleFontSize in FIG. 5B is the smallest font size having visibility. This visibleFontSize is determined in advance by the vendor that provides the cloud browser, and is stored by the font size determination unit 204. The visibleFontSize is used as a threshold value for when the font size determination unit 204 determines whether the size of a character included in the display information is larger than or equal to the visibleFontSize.

The "webPageSize" is the size of the rendering output obtained by drawing a Web page. DeviceScreenSize is a screen size of the communication terminal 20. The webPageSize is calculated using either or both of width and height of the rendering output. The webPageSize can be the value of width or the product of width and height. DeviceScreenSize is also calculated by using either or both of width and height of the screen of the communication terminal 20, and a calculation method similar to that of webPageSize is used.

MinFontSize is the minimum font size. MinFontSize is determined from the product of visibleFontSize and the ratio of webPageSize to deviceScreenSize. For example, visibleFontSize is 24 px, webPageSize is 800 px, and deviceScreenSize is 400 px. The ratio of webPageSize and deviceScreenSize is 2. Then, minFontSize=24 px×2=48 px. That is, when the rendering result is generated by setting the size of the characters of the Web page to be larger than or equal to the minimum font size in the information processing apparatus 10, the user can browse the characters at the font size having visibility even if the characters are reduced to half the size and displayed on the communication terminal 20. That is, since the characters included in the Web page can be displayed with a predetermined number of pixels or more, the visibility of the characters can be maintained.

Next, the information processing apparatus 10 sets the minimum font size determined in S303 such that the size of the character included in the Web page is larger than or equal to the minimum font size (S304). An example of S304 will be described using FIG. 5B. In the present example, webkit_settings_set_minimum_font_size( ) is used to set the minimum font size in the virtual browser 201.

A difference between the display of the screen of the communication terminal before applying the minimum font size and the display of the screen of the communication terminal after applying the minimum font size will be described with reference to FIGS. 6A to 8B.

Figure 6A:
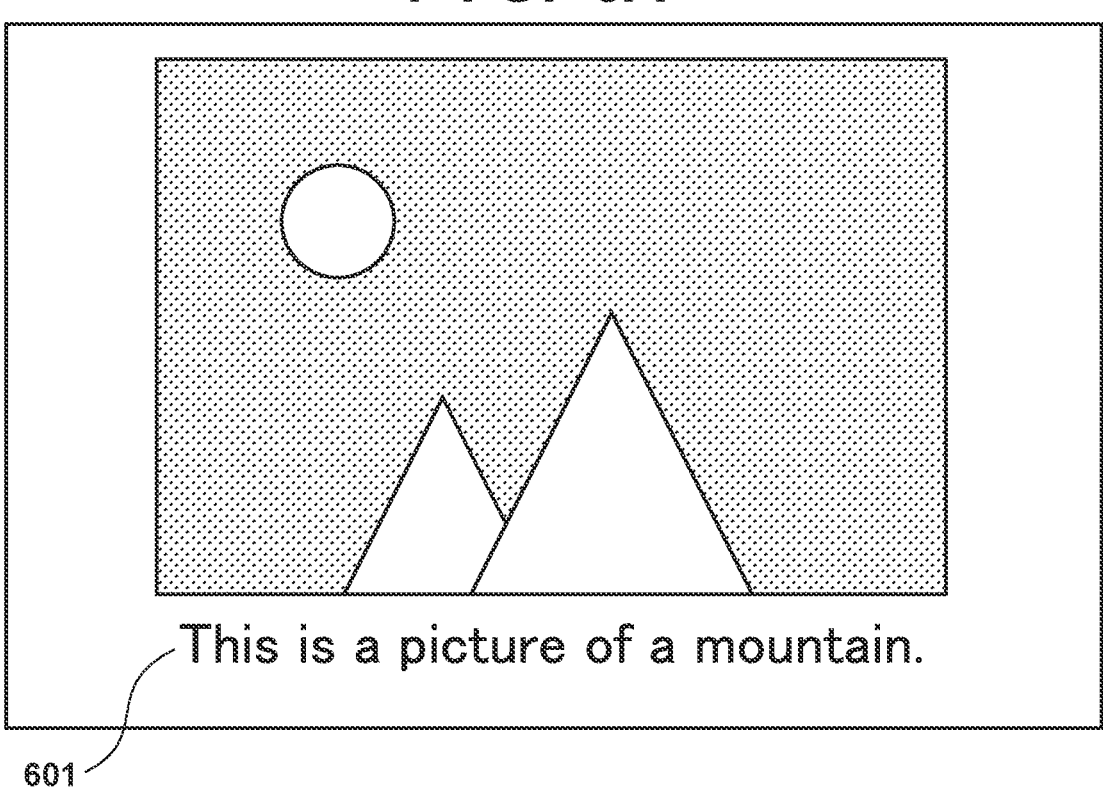
FIG. 6A is a diagram illustrating a rendering result in a case where a minimum font size is not set.
Figure 6B:
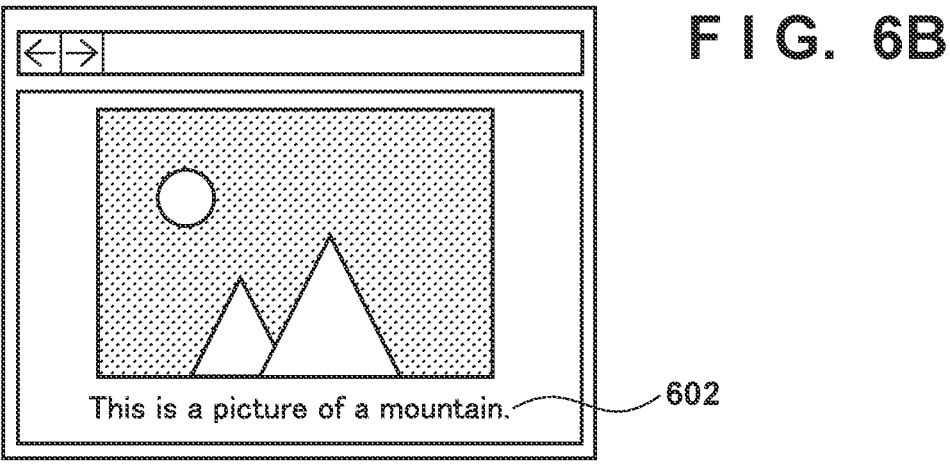
FIG. 6B is a diagram illustrating a result of displaying the rendering result of FIG. 6A on the terminal.

FIG. 6A illustrates a rendering result in a case where the minimum font size is not set, and FIG. 6B is a screen displayed on the screen of the communication terminal that has received the display information generated based on the rendering result of FIG. 6A. Note that width of the rendering output of the virtual browser 201 is 800 px, and width of the screen size of the communication terminal is 400 px. It is also assumed that the minimum font size at which the visibility does not lower is 24 px. A character string 601 in FIG. 6A is a character string included in the Web page, and the font size is 24 px.

Since the screen size of the communication terminal 20 is ½ of the size of the rendering result of the virtual browser 201, the screen size is reduced to ½ and displayed on the screen of the communication terminal 20. Therefore, as indicated in FIG. 6B by the character string 602 displayed on the screen of the communication terminal 20, the visibility lowers as the character string 601 is also reduced to 12 px of ½ the size and displayed.

Figures 7A, 7B:
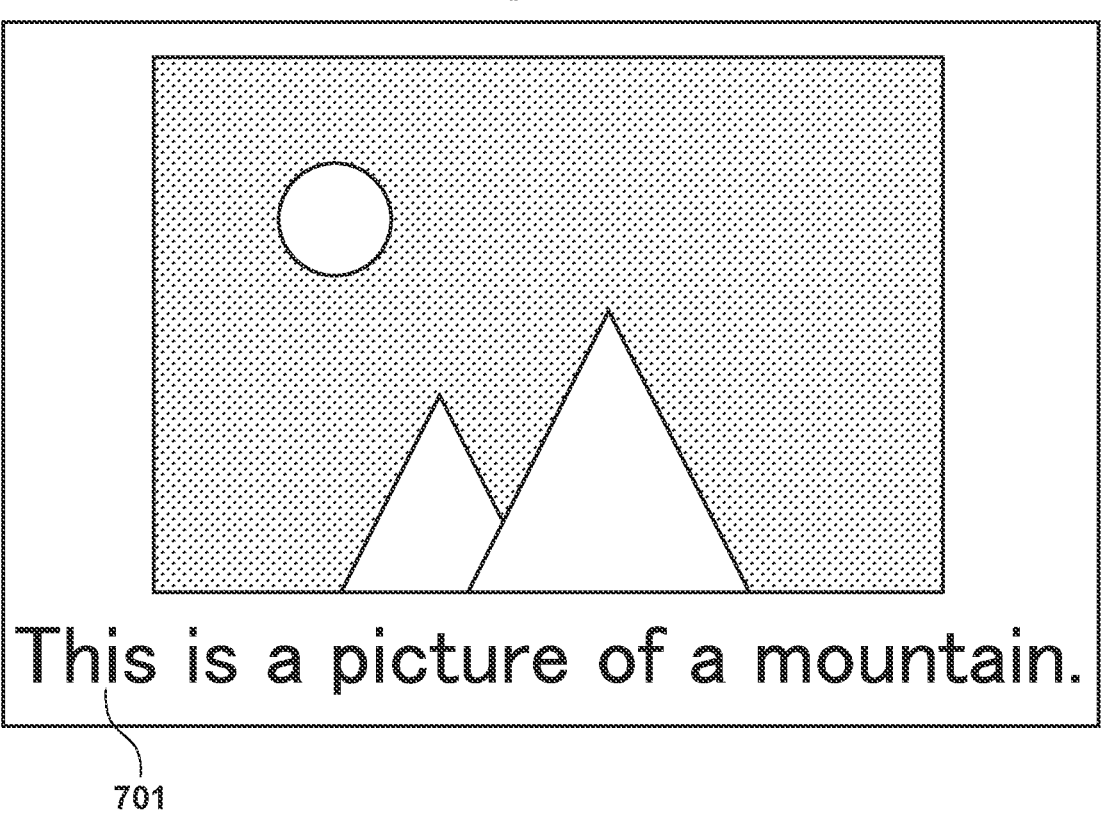
FIG. 7A is a diagram illustrating a rendering result in a case where a minimum font size is set.
FIG. 7B is a diagram illustrating a result of displaying the rendering result of FIG. 7A on the terminal.

FIG. 7A illustrates a rendering result in a case where the minimum font size is set with respect to a Web page similar to that in FIG. 6A, and FIG. 7B illustrates a screen displayed on a screen of the communication terminal that has received the display information generated based on the rendering result of FIG. 7A. It is assumed that the width of the rendering output of the virtual browser 201, the width of the screen size of the communication terminal 20, and the minimum font size are similar to those in FIG. 6A.

As illustrated in FIG. 7A, since the minimum font size is set, the font size is set so that all the characters having a size smaller than 48 px, which is the minimum font size, are larger than or equal to the minimum font size. In the example of FIG. 7A, the character string 601 of FIG. 6A is changed to a character string 701 having a font size of 48 px. Note that, in the character string 701, only the font size is changed as compared with the character string 601, and the characters are not changed.

The screen size of the communication terminal 20 is ½ of the size of the rendering output of the virtual browser 201. Therefore, when the rendering output is displayed on the screen of the communication terminal 20 in accordance with the display unit 116, the character string 701 is also reduced to ½ in size as illustrated in FIG. 7B, and the font size of the character string 702 is displayed in 24 px. As a result, as illustrated in FIG. 7B, the character string 702 is displayed larger than the character string 602 in FIG. 6B, and the visibility can be prevented from lowering.

Referring back to FIG. 3, the information processing apparatus 10 reads a Web page (S305). S305 to S311 are processes same as those of the known cloud browser. Since the minimum font size is set in S304, rendering is performed so that the size of characters included in the Web page is larger than or equal to the minimum font size. The information processing apparatus 10 receives the operation instruction from the communication terminal 20 (S306), and notifies the virtual browser 201 of the received operation instruction (S307). The screen of the virtual browser 201 is updated (S308), the display information is generated based on the rendering output (S309), and the display information is transmitted to the communication terminal (S310).

Subsequently, the instruction determination unit 202 determines whether the user has finished browsing of the Web page based on the instruction information received by the information processing apparatus 10 from the communication terminal 20 (S311). In a case where the user has finished browsing of the Web page as a result of the determination, the process illustrated in FIG. 3 is finished. In a case where the browsing of the Web page is to be continued as a result of the determination, the process returns to the S306.

Processing executed by the communication terminal 20 will be described with reference to FIG. 4.

The communication terminal 20 activates the dedicated view 211 (S401). The dedicated view 211 transmits screen information related to the screen of the communication terminal 20 to the information processing apparatus 10 (S402). In this processing example, the communication terminal 20 transmits information indicating the screen resolution of the communication terminal 20 to the information processing apparatus 10. Subsequently, the dedicated view 211 transmits operation information indicating the user operation to the information processing apparatus 10 (S403). As described above, the operation information includes at least one of movement in a Web page, a position or a selection element pressed by a user in a Web page, transition of a Web page, and termination of a cloud browser.

Next, whether the display information is received from the information processing apparatus 10 is determined (S404), and when the display information is received, the communication terminal 20 displays the display information on the display unit 116 (S405). In the present example, the dedicated view 211 displays the display information, and the display unit 116 displays the dedicated view 211 on the display unit 116 based on the display information. When the display information is not received in S404, the process proceeds to S406. S403 to S406 are processes same as those of the known cloud browser.

Subsequently, the communication terminal 20 determines whether the user has performed an operation to terminate the use of the cloud browser (S406). When the use is terminated, the process is terminated. When the use of the cloud browser is continued, the process proceeds to S403.

As described above, according to the present embodiment, in a case where the characters included in the Web page are small, as illustrated in FIG. 7B, the display of the communication terminal 20 is performed based on the display information generated from the rendering output in which the characters are enlarged based on the screen size of the communication terminal 20. As a result, visibility of characters can be prevented from lowering.

Second Embodiment

In the present embodiment, a configuration in which a divided display instruction is transmitted to display the display information in a divided manner will be described. Note that the same configurations, processes, and functions as those of the first embodiment are denoted with the same reference numerals and the descriptions thereof will be omitted.

The display information generation unit 206 according to the present embodiment enlarges and displays the layout from the original Web page without changing the layout by dividing and displaying the display information without changing the font size of the acquired Web page. Thus, as described in the first embodiment, when the font size of characters included in a Web page is changed, it is possible to prevent lowering in visibility due to collapse of the layout. In the following processing example, a process of determining that there is a possibility the layout may collapse when the font size of the characters is changed will be described.

First Processing Example

As described above in the first embodiment, when a font size larger than the font size designated by the Web page is applied and displayed, a line feed of the character string can occur as the horizontal width of the character area in which the character string is arranged is fixed. When a line feed of a character string occurs, a layout collapse occurs such as a character runs out from a character area or is displayed to overlap with another element on a Web page, and visibility may lower.

An example in which a line feed occurs due to a change in font size will be described using FIGS. 8A and 8B. FIG. 8A illustrates a result of displaying, on the screen of the communication terminal, the output of the virtual browser 201 when the font size is not changed. It is assumed that the horizontal width of the character area in which the character string 801 illustrated in FIG. 8A is arranged is designated. The horizontal width is a range divided by a dotted line. The left end of the character area is indicated by line 802 and the right end of the character area is indicated by line 803. When the display result of the character string becomes larger than this range, a line feed occurs.

FIG. 8B illustrates a result of displaying, on the screen of the communication terminal 20, the output of the virtual browser 201 when the font size of the character string for which the horizontal width of the character area is designated is enlarged. A character string in which the font size of the character string 801 is enlarged is the character string 811. Since the font size is larger than that of the character string 801, a line feed is performed in the middle so that the character string 811 fits between the lines 802 and 803, and the character runs out from the character area.

Therefore, in the present processing example, when the virtual browser 201 generates the rendering result, the display information generation unit 206 detects that an additional line feed occurs as compared with before changing the font size. Then, in a case where it is determined that an additional line feed occurs, the display information generation unit 206 cancels the application of the minimum font size, and generates the display information based on the rendering result output from the virtual browser 201 with the font size before being enlarged.

FIGS. 9 and 10 are flowcharts of the present example. FIG. 9 is a processing flow of the information processing apparatus 10, and is realized by the CPU 101 of the information processing apparatus 10 developing a program stored in the ROM 102 in the RAM 103 and executing the program. FIG. 10 is a processing flow of the communication terminal 20, and is realized by the CPU 111 of the communication terminal 20 developing a program stored in the ROM 112 in the RAM 113 and executing the program.

With respect to the processing flow of the information processing apparatus 10 illustrated in FIG. 9, a difference between the first embodiment and the present processing example will be described. In the present processing example, the processes of S901 to S904 are added after S305. Since the processes of S301 to S305 and S306 to S311 are the same as that of the first embodiment, the description thereof will be omitted.

After acquiring the Web page in S305, the virtual browser 201 acquires the character element in the Web page (S901). Here, the character element refers to a Web standard specification for representing characters, such as a text element and a div element. The character element includes information designating a horizontal width of an area in which characters are arranged.

Subsequently, the virtual browser 201 determines whether an additional line feed occurs when the font size is changed from the character element (S902).

The presence or absence of a line feed can be determined from information on the character string arranged by the character element, the horizontal width of the font when the minimum font size is applied, and the horizontal width of the area where the character string included in the character element is arranged. For example, assume that the character string is three characters of "ABC", the horizontal width of the font having the minimum font size is 24 px, and the horizontal width of the area where the character string is arranged is 48 px. In this case, since each character of the character string has a horizontal width of 24 px, it can be seen that 72 px is required for the entire character string. Since the horizontal width of the character elements is 48 px, it is determined that two characters A and B can be displayed in the first line of the character element, but C is displayed in the second line by adding a line feed.

As a result of the determination in S902, in a case where it is determined that no additional line feed occurs (No in S902), the information processing apparatus 10 proceeds the process to S306. In a case where it is determined that a line feed occurs (Yes in S902), the information processing apparatus 10 cancels the minimum font size (S903), and transmits an instruction to display the rendering result in a divided manner to the communication terminal 20 (S904). Subsequently the process returns to S306.

Next, a difference between the present example and the first embodiment will be described regarding processing of the communication terminal 20 with reference to FIG. 10. In the present example illustrated in FIG. 10, the processes of S1001 to S1002 are executed after S403. Since the processes of S401 to S403 and S404 to S406 are the same as that of the first embodiment, the description thereof will be omitted.

After the process of S403, the communication terminal 20 determines whether a screen dividing instruction has been received from the information processing apparatus 10 (S1001). When it is determined that the communication terminal 20 has received the screen dividing instruction (Yes in S1001), the information processing apparatus 10 enables the screen dividing mode of the dedicated view 211 (S1002). When determining that the communication terminal 20 has not received the screen dividing instruction (No in S1001), the communication terminal 20 returns the process to S404.

An example of a screen dividing mode of the dedicated view 211 will be described using FIGS. 11A to 11C. FIG. 11A is display information in a state where the minimum font size is not changed. That is, FIG. 11A is the same as the display information illustrated in FIG. 7A. A dotted line in FIG. 11A indicates a boundary line divided in the screen dividing mode. In the screen dividing mode, the display information is displayed in a divided manner with the dotted line 1101 as a boundary. S character string 1103 is also arranged.

FIG. 11B illustrates an example of displaying the display information illustrated in FIG. 11A in the screen dividing mode. In FIG. 11B, an upper left area of the display information divided by a dotted line 1101 is displayed. The button 1111 is a button for displaying an area on the right side of the area being displayed, that is, an upper right area of the display information divided by the dotted line 1101 in FIG. 11A. The button 1112 is a button for displaying an area on the right side of the area being displayed, that is, a lower left area of the display information divided by the dotted line 1101 in FIG. 11A. When the user selects the button, the dedicated view 211 switches the area to display in the display information.

FIG. 11C illustrates a display result of the dedicated view 211 after the user has selected the button 1112 in FIG. 11B. FIG. 11C illustrates a result of displaying the lower left area in the area divided by the dotted line in FIG. 11A. As illustrated in FIG. 11C, it is possible to display a character string in a large size such as a character string 1123 by displaying a part of the area in the dedicated view 211. In FIG. 11C, a button 1121 for switching to the display of the upper left area and a button 1122 for switching to the display of the lower right area are displayed among the areas divided by the dotted line in FIG. 11A.

As described above, when the font size of the character string in the Web page is enlarged, even when a line feed occurs, the characters can be displayed large while preventing the layout from collapsing.

Note that, in the examples of FIGS. 11A to 11C, the description has been provided assuming that the number of divisions of the screen dividing mode is four divisions of two divisions in the vertical and horizontal directions, respectively, but the number of divisions can be arbitrarily changed. In one example, the number of divisions can be determined from the output size of the virtual browser 201, the minimum font size, and the minimum size of the characters included in the Web page.

For example, the screen size is such that the width of the rendering output of the virtual browser 201 is 800 px and the width of the screen size of the communication terminal 20 is 400 px. It is also assumed that the minimum font size at which the visibility does not lower is 24 px. Then, it is assumed that the minimum value of the font size of the character string included in the Web page is 12 px. In this case, the information processing apparatus 10 determines to display the character string included in the Web page at twice the size to display the character string in the minimum font size. In other words, when the rendering output is displayed in 1600 px, the character string included in the Web page can be displayed in 24 px. Therefore, the information processing apparatus 10 instructs the communication terminal 20 to divide the rendering output into four in the horizontal direction at a scale of 2 times and display the rendering output, so that the screen can be divided and displayed in consideration of the visibility of characters. In such a case, the information processing apparatus 10 can transmit a dividing instruction including an instruction of the number of divisions to the communication terminal 20.

Second Processing Example

As a second processing example of the second embodiment, an example in which the information processing apparatus 10 uses the occupancy of the characters in the Web page to determine whether to cancel the minimum font size will be described.

In a Web page with a high occupancy of characters, when the font size is changed, there is a high probability that character elements arranged in the Web page overlap. Therefore, the information processing apparatus 10 can instruct such a Web page to display the rendering result in a divided manner without changing the font size.

FIG. 12 illustrates an example of a process executed by the information processing apparatus 10 of the present modified example. As compared with FIGS. 9 and 12, the process of S901 is changed to S1201, and the process of S902 is changed to S1202.

In S1201, the information processing apparatus 10 acquires the screen occupancy of the character element. The calculation formula of the screen occupancy of the character element is such that the screen occupancy of the character element=the total area of the display region of the character element/the total area of the display region of the Web page.

For example, the width of the Web page is 800 px, and the height is 600 px. In this case, the total area of the display region of the Web page is 800×600=480,000. Furthermore, assume that the total area of the display regions of the character elements is 420,000. In this case, the screen occupancy of the character elements is the total area of the display regions of the character elements/the display region of the Web page, and is therefore 420,000/480,000=87.5%.

Next, in S1202, the information processing apparatus 10 determines whether the screen occupancy of the character elements is larger than a predetermined threshold value, that is, whether the area of the character area with respect to the size of the entire Web page is larger than or equal to a predetermined ratio. For example, the predetermined threshold value is 80%. When the screen occupancy of the character element is 87.5%, the process proceeds to S903 as the occupancy is greater than the threshold value. As a result, when the occupancy of the characters is high, the rendering result obtained by rendering the Web page with the original font size without changing the font size can be displayed in a divided manner, and the visibility of characters can be prevented from lowering.

While in the above-described embodiments the minimum font size is described as being expressed by the number of pixels, in another example, the minimum font size can be associated with a physical size. For example, when the information processing apparatus 10 receives, as screen information, information indicating the dimension of the display unit 116 in addition to the resolution of the display unit 116, at which size the rendering output size of the virtual browser 201 is to be displayed can be determined. As a result, the minimum font size for displaying characters included in a Web page with a predetermined width such as, for example, a width of 5 mm can be determined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2022-182794, filed Nov. 15, 2022, which is hereby incorporated by reference herein in its entirety.

What is claimed is:

1. An information processing apparatus comprising:
a memory storing a program; and
a processor in communication with the memory, the processor when executing the program causes the information processing apparatus to:
acquire screen information for identifying a size of a screen of a communication terminal;
determine, based on the screen information, a minimum font size for displaying characters included in a predetermined Web page on the screen of the communication terminal in a predetermined font size;
set a font size of a character included in the predetermined Web page and smaller than the minimum font size to be larger than or equal to the minimum font size;
generate display information for displaying the predetermined Web page on a screen of the communication terminal based on the set font size; and
transmit the generated display information to the communication terminal,
wherein the processor causes the information processing apparatus to instruct the communication terminal to, when it is determined that a line feed is added in a case where a font size of a character string included in the Web page is changed to the minimum font size compared to a case where the font size of the character string is not changed to the minimum font size, display the Web page in a divided manner based on the display information.

2. The information processing apparatus according to claim 1, the processor further causing the information processing apparatus to receive, from the communication terminal, information indicating an operation of designating the predetermined Web page accepted by the communication terminal.

3. The information processing apparatus according to claim 1, wherein the screen information includes information indicating resolution of a screen of the communication terminal.

4. The information processing apparatus according to claim 3, wherein the minimum font size is determined such that a character included in the Web page is displayed with a predetermined number of pixels or more when the display information is scaled based on the resolution.

5. The information processing apparatus according to claim 1, wherein the processor causes the information processing apparatus to instruct the communication terminal about a number of divisions to be displayed in a divided manner so that characters of the predetermined Web page are displayed in a size of larger than or equal to the minimum font size.

6. The information processing apparatus according to claim 1, wherein
the Web page includes information indicating a size of a character area in which a character is arranged; and
when a size of the character area with respect to the entire Web page is larger than or equal to a predetermined ratio, the processor causes the information processing apparatus to instruct the communication terminal to display the Web page in a divided manner based on the display information.

7. The information processing apparatus according to claim 1, wherein the Web page includes Uniform Resource Locator information for acquiring information from a communication device external to the information processing apparatus; and the display information does not include the Uniform Resource Locator information.

8. A method comprising:

acquiring screen information for identifying a size of a screen of a communication terminal;

determining, based on the screen information, a minimum font size for displaying characters included in a predetermined Web page on the screen of the communication terminal in a predetermined font size;

setting a font size of a character included in the predetermined Web page and smaller than the minimum font size to be larger than or equal to the minimum font size;

generating display information for displaying the predetermined Web page on a screen of the communication terminal based on the set font size; and transmitting the generated display information to the communication terminal, wherein, when it is determined that a line feed is added in a case where a font size of a character string included in the Web page is changed to the minimum font size compared to a case where the font size of the character string is not changed to the minimum font size, display the Web page in a divided manner based on the display information.

9. A non-transitory computer-readable storage medium storing a computer program that, when executed by a processor, causes the processor to:

acquire screen information for identifying a size of a screen of a communication terminal;

determine, based on the screen information, a minimum font size for displaying characters included in a predetermined Web page on the screen of the communication terminal in a predetermined font size;

set a font size of a character included in the predetermined Web page and smaller than the minimum font size to be larger than or equal to the minimum font size;

generate display information for displaying the predetermined Web page on a screen of the communication terminal based on the set font size; and transmit the generated display information to the communication terminal, wherein, when it is determined that a line feed is added in a case where a font size of a character string included in the Web page is changed to the minimum font size compared to a case where the font size of the character string is not changed to the minimum font size, display the Web page in a divided manner based on the display information.

* * * * *